Nov. 17, 1953     W. J. BECKER     2,659,600
TOY HORSE
Filed Aug. 30, 1950
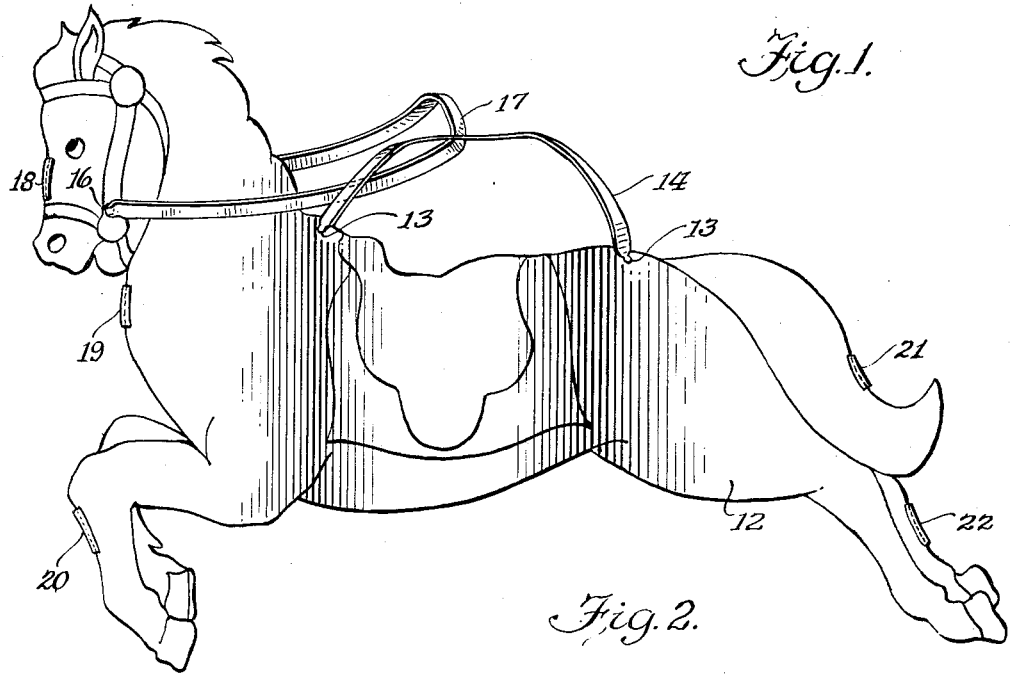
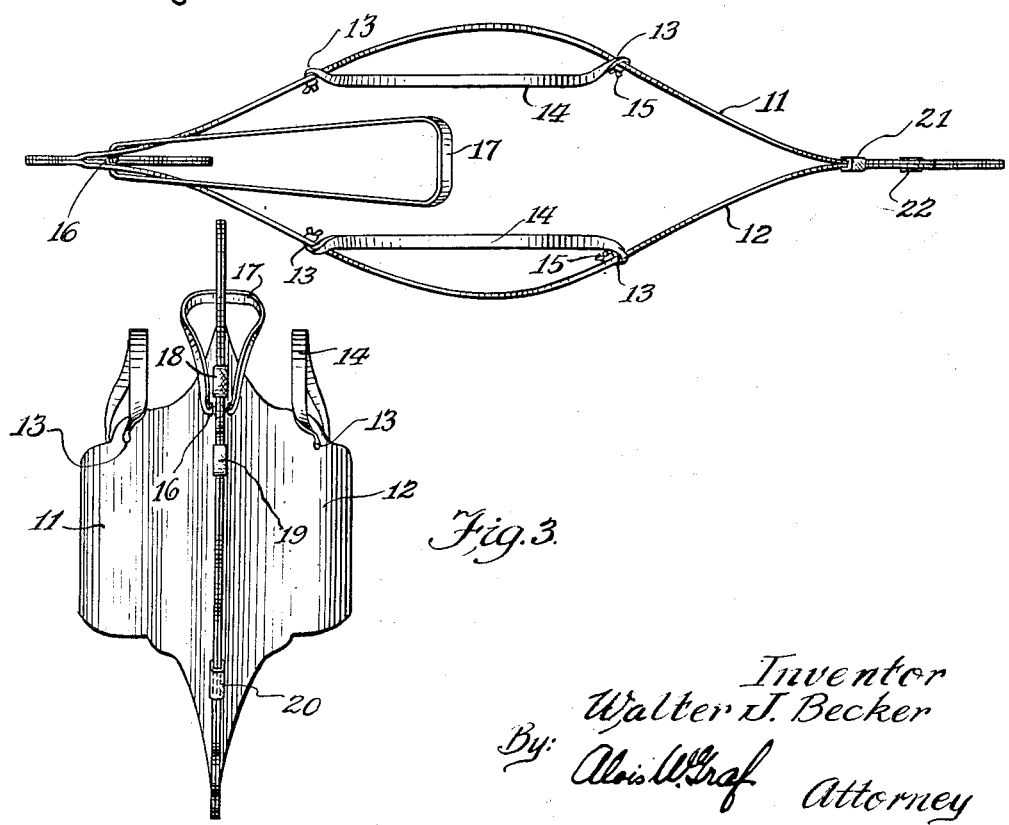
Inventor
Walter J. Becker
By: Alois W. Graf
Attorney Patented Nov. 17, 1953

2,659,600

UNITED STATES PATENT OFFICE 2,659,600

TOY HORSE

Walter J. Becker, Crown Point, Ind.

Application August 30, 1950, Serial No. 182,355

2 Claims. (Cl. 272—1)

The present invention relates to a hobby horse of the type which fits about the body of the user and is supported by shoulder straps.

Hobby horses of the general type contemplated by the present invention are not new, but certain features are deemed to be highly desirable and novel. In the past it has been customary to use relatively stiff paper board or a rigid wood frame and cloth to form the hobby horse. It furthermore has been customary to use cloth straps passing over the shoulders of the wearer to support such horse.

For the smaller children it would be much safer to provide a hobby horse having a more flexible structure, and also one which is lighter in weight. Furthermore, it would be desirable to provide a relatively economical construction, which in use, nevertheless, has certain attractive features not heretofore obtained. A more realistic bouncing action of the horse is obtainable. Furthermore, considerable endurance in the life of the hobby horse can be obtained by certain constructional features.

It is, therefore, an object of the present invention to provide an improved hobby horse of flexible paper board.

A further object of the invention is to provide a more realistic movement of the hobby horse when worn.

Still another object is to provide an improved hobby horse that can be rolled up and placed in a mailing tube for convenient shipping.

Still another object of the invention is to provide a hobby horse which is simple and economical to manufacture, and which can be readily assembled.

Other and further objects of the present invention subsequently will become apparent by reference to the following description taken in conjunction with the accompanying drawing wherein:

Figure 1 is an elevational view of a hobby horse embodying the features of the present invention;

Figure 2 is a top view of the structure shown in Figure 1; and

Figure 3 is a front view of the device shown in the previous figures.

Referring to the drawing there is shown a hobby horse constructed of two similar horse figures 11 and 12, preferably formed of a smooth, flexible paper board, generally classified as a type of Chipboard. It has been found that board of this type provides sufficient rigidity to hold the hobby horse in proper position when in use, and yet for shipment this paper board is sufficiently flexible that the entire horse can be rolled up and placed in a large mailing tube.

Each horse figure such as the figure 12 is provided along its back, in the proximity of the saddle position, with a plurality of holes 13 for receiving an elastic shoulder strap 14, which is fastened by formation of knots 15 on the inside of the hobby horse. The use of an elastic shoulder strap provides a more realistic movement of the horse when worn and, furthermore, minimizes the effect of any shock or strain which otherwise might damage the hobby horse when the individual bumps into objects. In the proximity of the mouth still another opening 16 is provided for receiving the reins 17, which also are formed of elastic material. Here again the use of elastic material for the reins 17 has a dual advantage in that shock to the hobby horse itself is minimized and the resilient feel obtained when grasping the reins 17 is much more nearly like the resilient effect obtained when actually riding a pony or horse.

The leading edge of each of the horse figures 11 and 12 is held together at a plurality of spaced apart points 18, 19 and 20 by adhesive strips of material. In a similar manner the trailing edge of the horse figures is held together by adhesive strips of material 21 and 22. In one form it is contemplated that all of the elements of the hobby horse will be packed in a mailing tube unassembled and that by simple instructions the shoulder straps and reins may be readily attached and thereupon the two horse figures secured together by the adhesive strips.

The holding of the horse figures together by strips placed in the places shown in the drawing produces a tendency on the part of the hobby horse to assume the configuration shown in Figure 2, when in use.

While for the purpose of illustrating and describing the present invention certain preferred modes of construction have been illustrated, it is to be understood that such variations are contemplated which might commensurate with the spirit and the scope of the invention as set forth in the following claims.

I claim:

1. A hobby horse comprising two identical horse figures made of flexible paperboard, said figures and terminating in knots, elastic reins top edges, a pair of elastic shoulder straps each passing through the apertures in one of said figures and terminating in knots, elastic reins connected to the heads of said figures, and adhesive strips interconnecting said figures at widely spaced intervals along the leading and trailing edges of said figures whereby the intermediate portions of said figures may be separated for insertion of a child's body, said hobby horse having a resiliency to cause said portions to cling to the child's body.

2. A hobby horse comprising two like horse shaped elements made of resilient flexible paperboard, said elements having apertures along the top edges, a pair of elastic shoulder straps each passing through the apertures in one of said elements and terminating in knots, elastic reins passing through apertures at the mouths of said horse shaped elements, and short adhesive strips of material interconnecting said elements at the head, chest, legs and tail of each element whereby the intermediate portions of said elements are adapted to be separated to engage and cling to the body of a child interposed between the intermediate portions of said elements.

WALTER J. BECKER.

References Cited in the file of this patent

UNITED STATES PATENTS

| Number | Name | Date |
| --- | --- | --- |
| 1,659,248 | Eldon | Feb. 14, 1928 |
| 1,914,732 | Breault | June 20, 1933 |
| 2,100,245 | Fagan | Nov. 23, 1937 |
| 2,264,214 | Lawrence | Nov. 25, 1941 |
| 2,585,279 | Sickelbower | Feb. 12, 1952 |